US008554538B2

(12) United States Patent
Stuhec

(10) Patent No.: US 8,554,538 B2
(45) Date of Patent: Oct. 8, 2013

(54) GENERATING A UNIQUE NAME FOR A DATA ELEMENT

(75) Inventor: Gunther Stuhec, Heidelberg (DE)

(73) Assignee: SAP AG, Walldorf (DE)

(*) Notice: Subject to any disclaimer, the term of this patent is extended or adjusted under 35 U.S.C. 154(b) by 2017 days.

(21) Appl. No.: 11/400,837

(22) Filed: Apr. 7, 2006

(65) Prior Publication Data

US 2007/0239435 A1   Oct. 11, 2007

(51) Int. Cl.
*G06F 17/27* (2006.01)
(52) U.S. Cl.
USPC .............................................. 704/9; 707/609
(58) Field of Classification Search
USPC ................................................ 704/9; 707/100
See application file for complete search history.

(56) References Cited

U.S. PATENT DOCUMENTS

| | | | | |
|---|---|---|---|---|
| 4,864,502 | A | * | 9/1989 | Kucera et al. ................. 704/8 |
| 5,418,957 | A | * | 5/1995 | Narayan ...................... 717/113 |
| 6,145,124 | A | * | 11/2000 | Price ........................... 717/153 |
| 6,560,608 | B1 | | 5/2003 | Tomm et al. |
| 6,662,237 | B1 | | 12/2003 | Leckie |
| 6,694,338 | B1 | | 2/2004 | Lindsay |
| 6,757,739 | B1 | | 6/2004 | Tomm et al. |
| 2007/0118354 | A1 | * | 5/2007 | Stuhec ............................. 704/9 |

OTHER PUBLICATIONS

ISO/IEC 11179 International Standard-Information Technology: Specification and Standardization of Data Elements (Part 5: Naming and Identification Principles for Data Elements), First Edition, Dec. 1, 1995.*
Searle, John R. "Chomsky's Revolution in Linguistics" The New York Review of Books. Jun. 29, 1972 (provided by applicant).*
ISO/IEC 11179-4: 1995, Information Technology—Specification and Standardization of data elements—Part 4: Rules and guidelines for the formulation of data definitions.*
"Adobe LiveCycle Designer FAQ" *Adobe Systems Incorporated*, document undated, 3 pages.
"Core Components Technical Specification V2.01—Part 8 of the ebXML Framework" for UN/CEFACT, Nov. 15, 2003, pp. 1-113.
XForms 1.1, W3C Working Draft Nov. 15, 2004, Obtained from the Internet at http://www.w3.org/TR/2004/WD-xforms11-20041115, on Dec. 6, 2004, 26 pages.
XML Schema, W3C, Obtained from the Internet http://www.w3.org/XML/Schema on Jan. 3, 2005, 16 pages.
XForms—The Next Generation of Web Forms, W3C, obtained from the Internet at http://www.w3.org/MarkUp/Forms, on Jan. 3, 2005, 11 pages.

(Continued)

*Primary Examiner* — Talivaldis Ivars Smits
*Assistant Examiner* — Shaun Roberts
(74) *Attorney, Agent, or Firm* — Fish & Richardson P.C.

(57) ABSTRACT

Operations for generating a unique name for at least one of several data elements include receiving a definition of a data element for which a unique name is to be created. The unique name is to comply with a predefined name format. The definition comprises human-understandable descriptive language. The data element is to identify an information category in an electronic communication. A noun phrase and a verb phrase are identified in the definition, and the unique name is generated using a first noun obtained from the noun phrase and a second noun obtained from the verb phrase. A computer system includes a repository having the data elements stored therein, and a name generating module that receives at least one of the definitions that is associated with one of the data elements and generates a unique name for the data element.

20 Claims, 11 Drawing Sheets

(56) References Cited

OTHER PUBLICATIONS

XML Path Language (XPath) Version 1.0—W3C Recommendation Nov. 16, 1999, W3C, Obtained from the Internet at http://www.w3.org/TR/xpath, on Jan. 3, 2005, 37 pages.

InfoPath 2003 Product Overview, Microsoft Office Online, Obtained from the Internet at http://www.microsoft.com/office/infopath/prodinfo/overview.mspx, on Jan. 4, 2005.

Davis, J., *Context Tailor: Towards a Programming Model for Context-Aware Computing*, International Middleware Conference Workshop Proceedings—Middleware for Pervasive and Ad Hoc Computing, Jun. 16-20, 2003, Rio de Janeiro, Brazil, 68-75, 2003.

Oasis ebXML Registry TC[online], Oasis, 2005 [retrieved on Mar. 23, 2005]. Retrieved from the Internet: <URL: http://www.oasis-open.org/committees/tc_home.php?wg_abbrev=regrep>.

GoXML Registry [online], Xenos, 2002 [retrieved on Mar. 23, 2005]. Retrieved from the Internet: <URL: http://www.xmlglobal.com/solutions/prod_goxml_registry.asp>.

The Company of the Open Standard Solutions [online], ebXMLsoft Inc., 2001-2004 [retrieved on Mar. 23, 2005]. Retrieved from the Internet: <URL: http://www.ebsmlsoft.com/>.

Project: ebXML Registry/Repository: Summary [online], SourceForge.net, 2005 [retrieved on Mar. 23, 2005]. Retrieved from the Internet: <URL: http://sourceforge.net/projects/ebsmlrr>.

AnHai Doan, Jayant Madhaven, Pedro Domingos, and Alon Halevy, "Learning to Map between Ontologies on the Semantic Web," May 2002, *Proceedings of the 11th International World Wide Web Conference*, pp. 662-673.

L. M. Haas, R. J. Miller, B. Niswonger, M. Tork Roth, P. M. Schwarz, and E. L. Wimmers, "Transforming Heterogeneous Data with Database Middleware: Beyond Integration," Copyright 1997, *Computer Society Technical Committee on Data Engineering*, pp. 1-6.

Hong-Hai Do and Erhard Rahm, "COMA—A system for flexible combination of schema matching approaches," Aug. 2002, *Proc. 28th Intl. Conference on Very Large Databases (VLDB)*, Hongkong, pp. 1-12.

Hong-Hai Do, Sergey Melnik, and Erhard Rahm, "Comparison of Schema Matching Evaluations," Oct. 2002, *Proc. GI-Workshop* "Web and Databases", Erfurt, pp. 1-15.

Jayant Madhavan, Philip A. Bernstein, and Erhard Rahm, "Generic Schema Matching with Cupid," 2001, *Proceedings of the 27$^{th}$ VLDB Conference*, pp. 49-58.

Jayant Madhaven, Philip A. Bernstein, and Erhard Rahm, "Generic Schema Matching with Cupid," Aug. 2001, *Microsoft Research*, MSR-TR-2001-58, pp. 1-15.

Sergey Melnik, Hector Garcia-Molina, and Erhard Rahm, "Similarity Flooding: A Versatile Graph Matching Algorithm and its Application to Schema Matching," 2002, *Proc. 18$^{th}$ Int'l Conf. on Data Engineering (ICDE)*, pp. 1-12.

Lucian Popa, Yannis Velegrakis, Renee J. Miller, Mauricio A. Hemandez, Ronald Fagin, "Translating Web Data," 2002, *Proceedings of the 28$^{th}$ VLDB Conference*, pp. 1-12.

Hong Su, Harumi, Kuno, and Elke A. Rundensteiner, "Automating the Transformation of XML Documents," 2001, *The ACM Digital Library*, pp. 68-75.

http://www.flexisoftsolutions.com/Products/SM2004/SM2004.aspx—*FlexiSoft Solutions*, obtained from the Internet on Jun. 24, 2005, 4 pages.

http://ww.notes.queensu.ca/uisadmin.nsf/579a5e3cc0e046c085256833007715cc/$FILE/queries_guide.pdf—BI/Query Queries Guide, *Hummingbird, Ltd.*, obtained from the Internet on Jul. 18, 2005, 6 pages.

"Final Committee Draft ISO/IEC FCD—Information technology—Metadata registries (MDR)—Part 5: Naming and identification principles" *ISO/IEC*, document dated Jan. 8, 2004, 26 pages.

Goyal, "An XML Schema Naming Assister for Elements and Types," *National Institute of Standards and Technology*, document obtained at http://www.mel.nist.gov/msidlibrary/doc/NISTIR7143.pdf on Jun. 24, 2005, 11 pages.

"Information technology—Metadata registries (MDR)—Part 4: Formulation of data definitions," *ISO/IEC*, document dated Jul. 15, 2004, 16 pages.

"Information technology—Specification and standardization of data elements—Part 5: Naming and identification principles for data elements," *ISO/IEC*, document dated Dec. 1, 1995, 20 pages.

GEFEG EDIFIX, "EDIFIX Functions," [online], Xenos, 2002 [retrieved on Nov. 30, 2005]. <URL: http://www.gefeg.com/en/edifix/fx_functions.htm>.

"Information technology—Metadata Registries (MDR)—Part 1: Framework" International Standard ISO/IEC 11179-1; Sep. 15, 2004; (32 pages).

"Information technology—Metadata Registries (MDR)—Part 2: Classification"; International Standard ISO/IEC 11179-2; Nov. 15, 2005 (16 pages).

"Information Technology—Metadata Registries (MDR)—Part 3: Registry Metamodel and Basic Attributes"; International Standard ISO/IEC 11179-3; Feb. 15, 2003 (108 pages).

"Information Technology—Metadata Registries (MDR)—Part 4: Formulation of Data Definitions" International Standard ISO/IEC 11179-04; Jul. 15, 2004 (16 pages).

"Information Technology—Metadata Registries (MDR)—Part 5: Naming and Identification Principles"; International Standard ISO/IEC 11179-5; Sep. 1, 2005.

"Information Technology—Metadata Registries (MDR)—Part 6: Registration". International Standard ISO/IEC 111790-6; Jan. 15, 2005.

ebXML Business Process Specification Schema Version 1.01 [online]. Oasis 2001, [retrieved on Mar. 21, 2005]. Retrieved from the Internet: <URL: http://www.ebxml.org/specs/ebBPSS.pdf>.

"Chomsky's Revolution in Linguistics" [online]. The New York Review of Books, 1972, [retrieved on Sep. 12, 2005]. Retrieved from the Internet: <URL: http://www.chomsky.info/onchomsky/19720629.htm>.

* cited by examiner

GENERATING A UNIQUE NAME FOR A DATA ELEMENT

TECHNICAL FIELD

The description relates to automatically generating a unique name for a data element using a definition for the data element.

BACKGROUND

Electronic communication can be streamlined using data elements to identify specific information portions in the electronic message. The elements are to be used as components of the electronic communication in that they are individually associated with the different categories of information included therein. Using a commonly accepted form of such elements, such as a form adopted by standard or agreed upon between business partners, eliminates some problems or inconsistencies that may otherwise occur. For example, the standard UN/CEFACT Core Components Technical Specification (CCTS) defines Core Components as context-independent data elements to be used as building blocks in such an endeavor. Similarly, the CCTS defines Business Information Entities as context-specific elements.

The CCTS also defines the concept of Dictionary Entry Names (DENs) to be used for Core Components, Business Information Entities, or the data types upon which either of these elements is based. The DENs are based on a natural language—primarily English—such that humans and machines can understand the meaning and logic thereof. The DENs should be carefully chosen to reflect the semantics of each named data element. Particularly, the CCTS prescribes the use of a naming approach defined in the standard ISO 11179-5. The controlled composition of terms provides an assigned meaning (the semantic) of a DEN.

A naming convention such as the ISO 11179 may be simply descriptive; e.g., where an authority that registers the data elements and their names has no control over the formulation of names for a specific context. As another example, a naming convention may be prescriptive, specifying how names shall be formulated, wherein the registering authority (or equivalent) is expected to enforce compliance with the naming convention. A prescriptive naming convention may be implemented to ensure name consistency, a certain name appearance, and reliable name semantics, such that users can infer facts about the definition of the administered items from their respective names. An effective naming convention can also enforce the exclusion of irrelevant facts about the administered item from the name, such as the input source of a data element or its field position in a file.

SUMMARY

The invention relates to generating a unique name for a data element.

In a first general aspect, a computer program product including instructions is tangibly embodied in an information carrier. When executed, the instruction cause a processor to perform operations for generating a unique name for at least one of several data elements. The operations include receiving a definition of a data element for which a unique name is to be created. The unique name is to comply with a predefined name format. The definition comprises human-understandable descriptive language. The data element is to identify an information category in an electronic communication. The operations further include identifying a noun phrase and a verb phrase in the definition, and generating the unique name using a first noun obtained from the noun phrase and a second noun obtained from the verb phrase.

Implementations may include any or all of the following features. Identifying the noun phrase and the verb phrase may include generating a hierarchical tree for the definition. Generating the hierarchical tree may include parsing the definition at a word class level. The noun phrase may include the first noun and the verb phrase may include the second noun. The verb phrase may include another noun phrase and the second noun may be obtained from the other noun phrase. The operations may further include applying a rule to the definition to obtain at least one of the first and second nouns. The rule may define how to truncate a word. The predefined name format may require the unique name to comprise at least a first term for an object class to which the data element relates, and the second noun may be used as the first term. The predefined name format may require the unique name to comprise also a second term for a property of the object class, and another noun associated with the verb phrase may be used as the second term. The operations may further include converting a verb in the verb phrase to obtain the other noun associated with the verb phrase. The predefined name format may require the unique name to comprise also a third term for a representation form of the data element, and the first noun may be used as the third term. The operations may further include eliminating a consecutive redundancy among the first, second and third terms. The data element may include a data type that can be used in defining any of the several data elements and the predefined name format may require the unique name to include at least a qualifier term, a data term and a type term. The operations may further include identifying a compound noun in the verb phrase and obtaining the qualifier term from the compound noun.

In a second general aspect, a computer system includes a repository having stored therein data elements that are configured to identify information categories in an electronic communication. Each of the data elements is associated with a definition comprising human-understandable descriptive language. The computer system further includes a name generating module that receives at least one of the definitions that is associated with one of the data elements and generates a unique name for the data element. The unique name complies with a predefined name format. The unique name is generated using a first noun and a second noun. The first noun is obtained from a noun phrase in the definition and the second noun is obtained from a verb phrase in the definition.

Implementations may include any or all of the following features. The name generating module may generate a hierarchical tree for the definition. The name generating module may further include rules that can be applied to the definition to obtain at least one of the first and second nouns. The predefined name format may require the unique name to include at least a first term for an object class to which the data element relates, and the name generating module may use the second noun as the first term. The predefined name format may require the unique name to include also a second term for a property of the object class, and the name generating module may use another noun associated with the verb phrase as the second term. The predefined name format may require the unique name to include also a third term for a representation form of the data element, and the name generating module may use the first noun as the third term.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
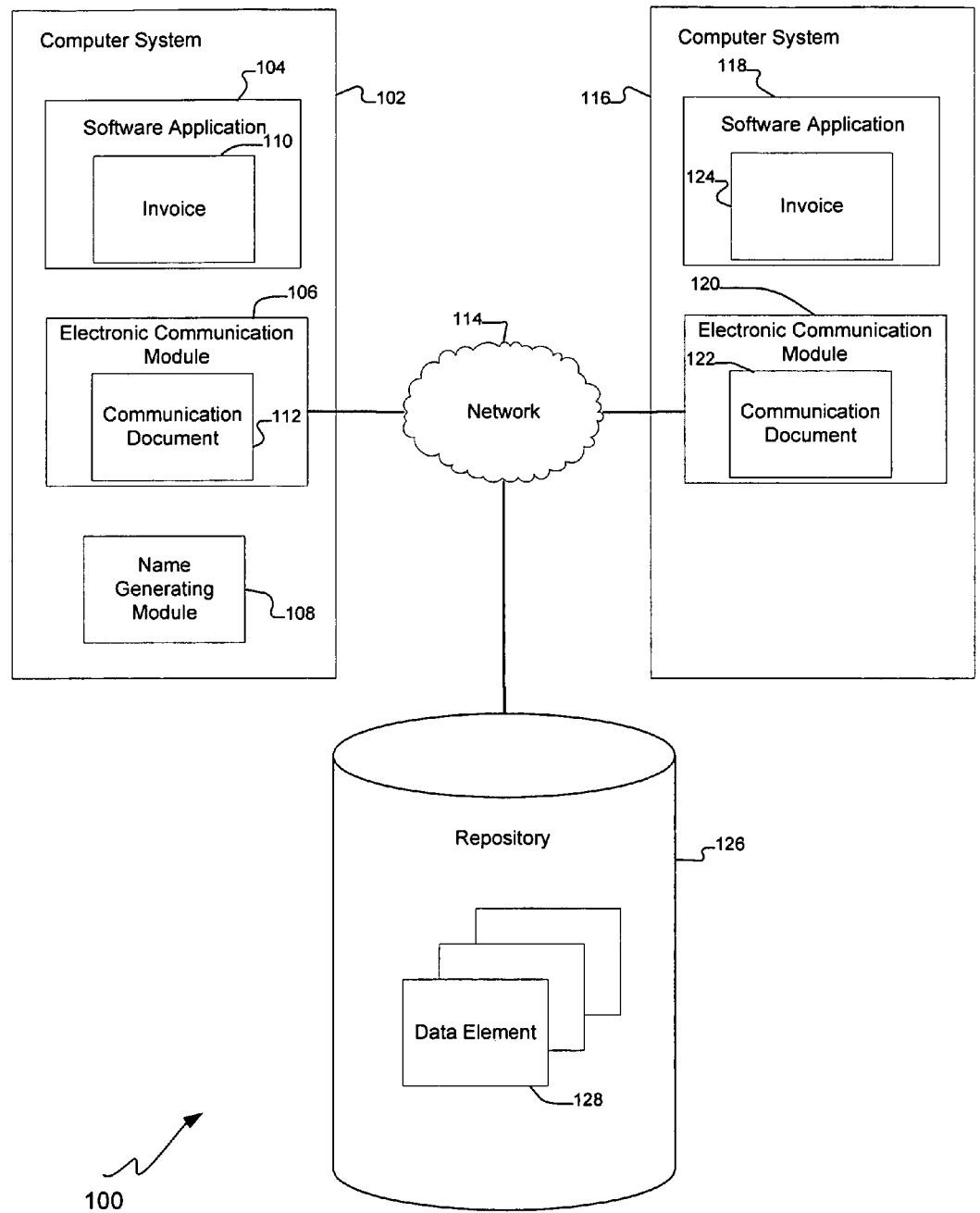
FIG. 1 is a block diagram of a system that uses unique names for electronic communication.

FIG. 1 shows an exemplary system 100 for generating a unique name for at least one of several data elements. A data element can be included as a component of an electronic communication, such as in a formatted electronic document, to identify a specific information category or information portion therein. Each data element may be associated with a semantic meaning and a unique name related to the semantic meaning of the data element. The exemplary system 100 includes a module to automatically generate the unique names for one or more of the data elements based on a definition for each data element. The generated names comply with a predefined name format.

The system 100 includes a computer system 102. In the exemplary system 100, the computer system 102 includes a software application 104, an electronic communication module 106, and a name generating module 108. The software application 104 may be a software editor that presents electronic documents. In this example, the software application 104 is capable of preparing and displaying electronic business information, such as an electronic invoice 110, an electronic order, or an address book with business contact information. The software application 104 creates electronic documents using information available in the computer system 102 and following a specific format. The computer system 102 can prepare an electronic document and can store it as a communication document 112 for electronic communication.

The computer system 102 may communicate with other computer systems using the electronic communication module 106 through a network 114. Through the network 114 the computer system 102 may communicate with another computer system 116. The computer system 116 further includes a software application 118 that is capable of displaying formatted electronic documents, and an electronic communication module 120 for engaging in communication over the network 114.

The electronic communication module 120 currently contains a communication document 122, which the electronic communication module 120 can exchange over the network 114. In one embodiment, the electronic communication module may be a Local Area Network (LAN) interface and the network 114 may be the internet. For example, the communication document 122 may be a document that the computer system 116 receives from the computer system 102, or it may be a document that the computer system 116 generates for sending to the computer system 102. Different software applications may use different formats to construct electronic documents. For example, in electronic business communication, there are a wide variety of formats such as EDIFACT, X12, OAG, a CCTS-based schema, or SAP IDoc. In the exemplary system 100, the software application 118 may be configured to display an invoice 124 to a user based on the communication document 122.

The communication document 112 and the communication document 122 use data elements to identify information portions. The receiving software application 104 and the software application 118 can therefore format them in any format because the semantics of the data elements are accessible in a repository. The communication can be bidirectional, i.e. the computer system 102 may send or receive communication documents from the computer system 116. For brevity, suppose the computer system 116 is to receive a communication document from the computer system 102. In this example, the software application 104 first creates the communication document 112 using data elements. The data elements identify specific portions of information in the content of the communication document 112. Upon receiving the communication document 112, the computer system 116 may interpret the content of the communication document 112 using the data elements in the document 112. For example, the computer system 116 can access a repository that stores definitions of the data elements to interpret them. The repository may be publicly accessible or it may require controlled access.

The exemplary system 100 includes an example of a repository 126, which is accessible by the computer systems 102 and 116. The repository 126 stores a list of data element entries 128. Each data element entry 128 could include the definitions and the names of data elements, or it could be a list of data elements associated with names and definitions stored elsewhere. The data element entries 128 can be used to identify a specific type or category of information in an electronic communication, such as an address or an invoice amount.

Each data element is associated with a definition of what the data element is or how to use it. For example, the definition may read: "This date is the shipping date". The definition is typically created by a person that is configuring the system 102 for electronic communication, because the data element should be chosen so that it meets the needs of the information that is to be exchanged. Preexisting definitions can be used. Reading a definition can help a user decide whether to choose a particular data element for a specific category of information. To make the process of selecting and using the data element easier, each data element may also be given a unique name, such as "shipping.date.type".

The following example illustrates a process of using data elements stored in the repository. In the exemplary system 100, suppose the owner of the computer system 102 and the owner of the computer system 116 wish to engage in business transactions. The transactions are to be completed, in part, through electronic communication by transmitting an invoice from the seller to the buyer. The individual portions of invoice information should be identified using data elements defined in the repository 126. The seller, here system 102, creates the invoice template using appropriate data elements from the repository and announces to the buyer, here system 116, that data elements from the publicly accessible repository 126 will be used in the transaction. The system 102 then creates the invoice using the template and transmits the created invoice over the network. The computer system 116 receives the transmitted invoice in form of the communication document 122. At an earlier time, or upon receiving the communication document 122, the buyer configures the system 116 to recognize the data elements used in the invoice. For example, the system 116 retrieves all available data elements from the repository, or retrieves those data elements that occur in the invoice. With the data elements being defined in the system 116, the information identified by them can be displayed and otherwise processed as necessary. For example, information labeled as the seller's address can be automatically displayed in the proper portion of the screen and used in automatically tracking, or remitting payment on, the invoice. Therefore, the computer system 116 may view the received invoice by opening the communication document 122 using the software application 118. The invoice 124 is presented in the format specified by the software application 118.

A computer system with access to the repository 126 may search the definitions of a data element, or the unique name associated with the data element, or both. The unique name complies with a predefined format and is recognizable by all computer systems that use the data element. Therefore, the unique name is informative and useful in understanding the data element. In the exemplary system 100, the name generating module 108 is responsible for generating the set of unique names. A block diagram showing an example of components in the name generating module 108 is shown in FIG. 2.

Figure 2:
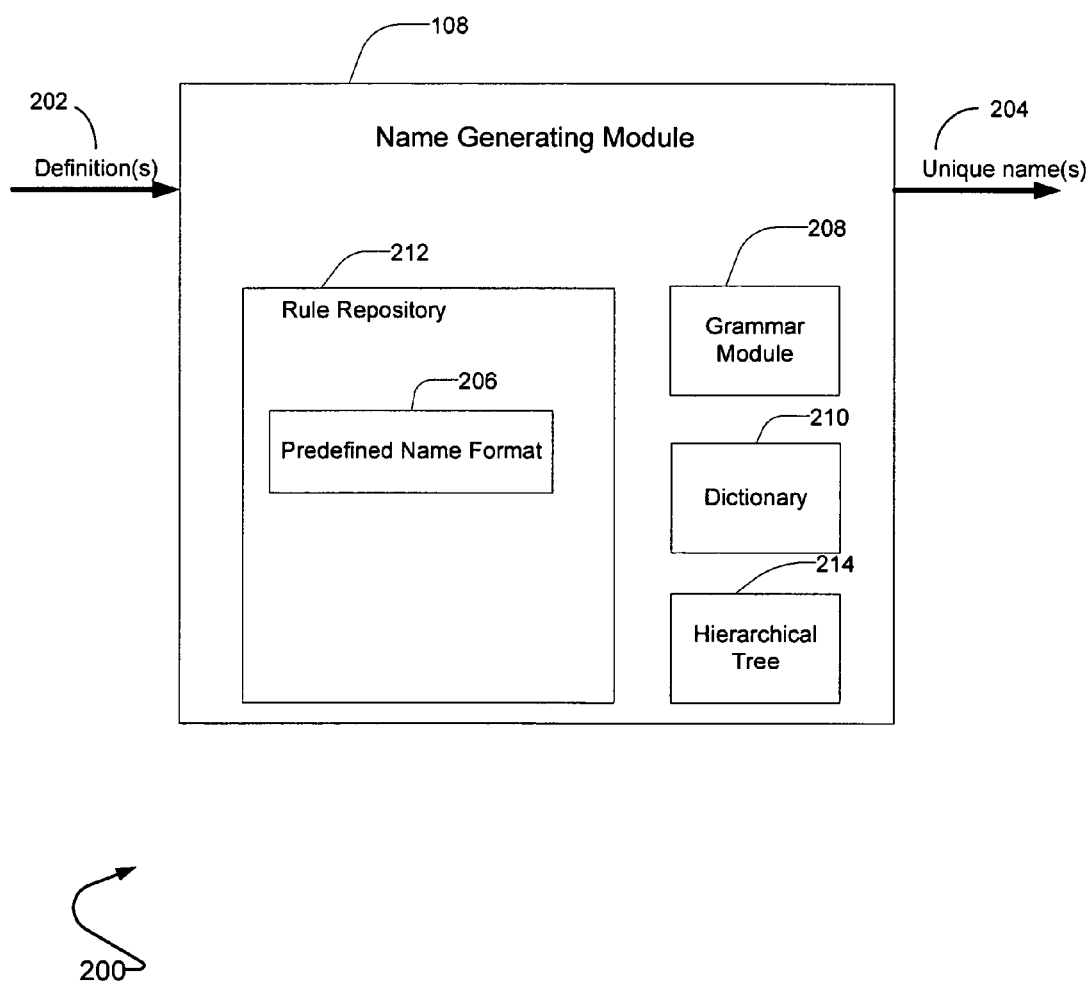
FIG. 2 is a block diagram of a system that generates unique names using input definitions.

FIG. 2 shows a system 200 including an example of the name generating module 108 that is capable of generating unique names for data elements using the definition for each respective element. The name generating module 108 receives definition(s) 202 as input and creates unique name(s) 204 as output. The exemplary name generating module 108 includes a predefined name format 206, a grammar module 208, a dictionary 210, a rule repository 212, and a hierarchical tree 214. The received definition 202 is formulated in a human-understandable descriptive language. This means that the definition is composed of terms, phrases or expressions corresponding to, and consistent with, those vocabularies included in the dictionary 210 and furthermore follows the grammar defined in the grammar module 208. For example, the definition may be composed of one or more sentences in English.

The predefined format 206 defines the requirement of the format of the generated unique name 204. For example, the predefined format 206 could be an international standard for generating dictionary entry names (DENs), such as the ISO 11179 and the rules of UN/CEFACT Core Component Technical Specification (CCTS). In another example, the predefined name format 206 may also be a private naming convention agreed between two or more business partners.

The name generating module 108 goes through a process to generate unique names 204 that comply with the predefined name format 206. The process may use rules stored in the rule repository 212. The name generating module 108 may apply the rules to the definition 202 to obtain one or more nouns that are useful for generating the unique name 204. This may involve using a set of rules based on generative and transformational grammar, which is a proof-theoretical approach to the study of syntax of sentences. Such rules may be inspired by a formal grammar of precisely describing a formal language. One of the essential parts of this formal grammar is the representation of context-free grammars (defined in the Chomsky-Hierarchy), which can be depicted as a derivation tree. This derivation tree is a key part for analyzing sentences and representing the coherence of words in sentences by subordinate and superordinate branches connected at nodes. According to these branches and nodes, it is possible to derive the correct terms of a DEN, getting the unambiguous meaning that is originally represented in the definition sentence. The correct derivation and serialization of terms are based on further rules, in addition to the generative and transformational grammar.

In one embodiment, the name generating module 108 may first parse the definition into at least one noun phrase and at least one verb phrase. The name generating module 108 may use a first noun obtained from the noun phrase, a second noun obtained from the verb phrase, and a third noun associated with the verb phrase to create the unique name 204. The rules may also define how to truncate a word obtained from the definition 202.

The name generating module 108 may parse the definition 202 to generate the hierarchical tree 214. Information useful for generating the unique name 204, such as the respective nouns, may be obtained from the hierarchical tree 214. Using the result from the hierarchical tree 214, such as an identified first noun, an identified second noun, and an identified verb, the name generating module 108 may further apply rules from the rule repository 212 to generate a unique name 204.

Figure 3A:
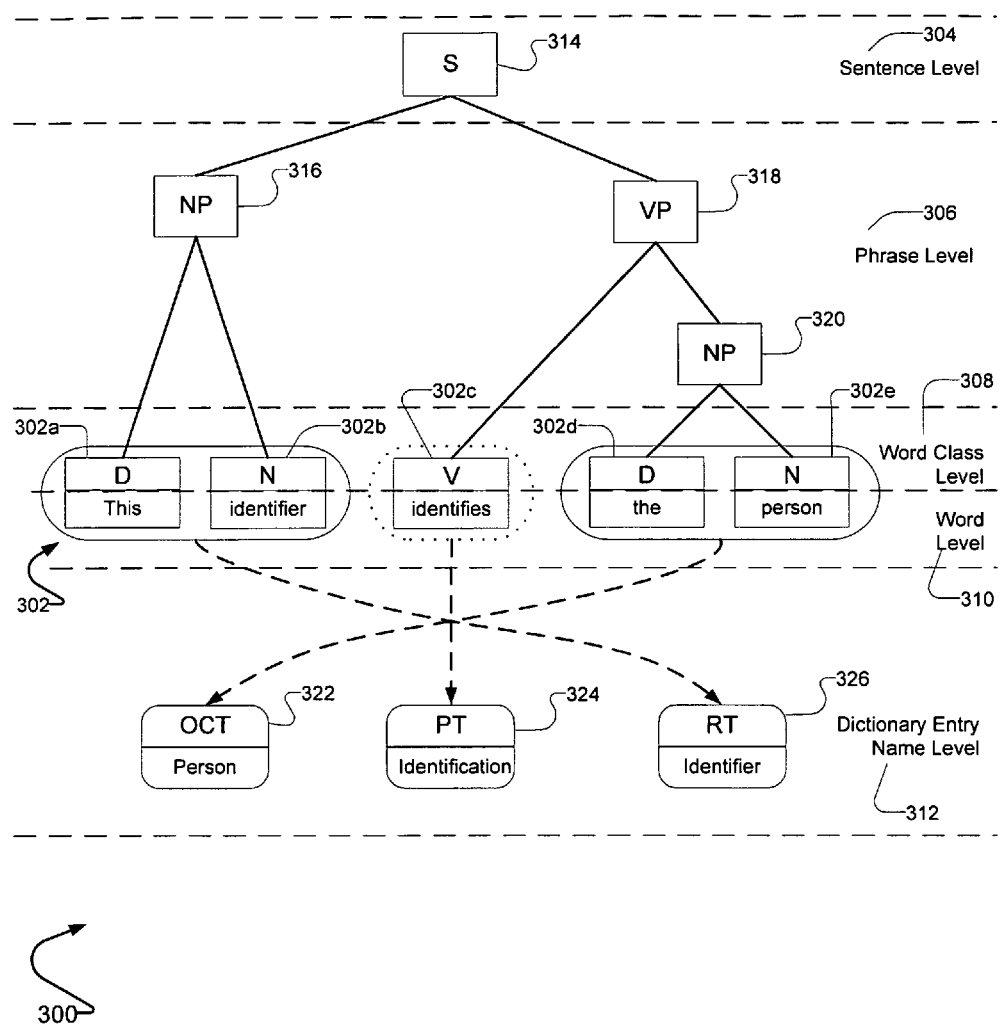
FIG. 3A is a hierarchical tree diagram showing an exemplary generation of a dictionary entry name from a data element definition.

FIG. 3A shows an exemplary hierarchical tree 300 that the name generating module 108 may create to generate a dictionary entry name from a definition 302. One example of the hierarchical tree 300 may be a phrase structure tree with which the system can parse a sentence using a linguistic approach. In this example, the definition 302 reads "This identifier identifies the person". In other words, the definition 302 states that the data element being defined is an identifier and that this identifier is to be used in identifying a person. Based on this definition 302, the name generating module 108 will create a unique name for the data element. The hierarchical tree 300 includes a sentence level 304, a phrase level 306, a word class level 308, a word level 310, and a dictionary entry name level 312.

The name generating module 108 parses the definition 302 from the sentence level 304 toward the word class level 308 in one or more steps. At the sentence level 304, a sentence 314 includes the definition 302 in its entirety. At the phrase level 306, the name generating module 108 parses the sentence 314 into a first noun phrase 316 and a verb phrase 318. Here, the first noun phrase 316 is "This identifier" and the verb phrase 318 is "identifies the person". At the phrase level 306, the name generating module 108 may identify a second noun phrase 320 within the verb phrase 318. For the definition 302, the second noun phrase 320 is "the person". At the word class level 308, the name generating module 108 parses the first noun phrase 316 into a determiner 302a and a first noun 302b. The determiner 302a is the word "This" and the first noun 302b is the word "identifier". The name generating module 108 parses the definition 302 into a verb 302c "identifies" and the second noun phrase 320. The name generating module 108 parses the second noun phrase 320 into a determiner 302d that is "the" and a noun 302e that is "person". As will be discussed below, the rules may further regulate that articles in noun phrases are to be deleted and that only a certain combination of words in a phrase will lead to a specific term being adopted.

From the words identified at the word level 310 and their corresponding classes at the word class level 308, the name generating module 108 may create a dictionary entry name following one or more rules defined in the rule repository 212. Here, the predefined name format requires the unique name to include an object class term, a property term and a representation term. An object class term is a part of a unique name of a data element that represents the object class to which it belongs. A property term is a part of a unique name of a data element that expresses a property of an object class. A representation term is a part of a unique name that represents the form of a set of valid values for a data element, due for example to the data element being defined as having a certain data type. The object class terms, property terms, and representation terms may be those used with implementations of the CCTS standard.

In the hierarchical tree 300, the name generating module 108 generates a dictionary entry name that consists of three terms. A first term is an object class term 322. A second term is a property term 324. A third term is a representation term 326. From the word class level 308, the name generating module 108 selects the noun 302b as the representation term 326 and the noun 302e as the object class term 322. To obtain the property term 324, the name generating module 108 converts the verb 302c in into a noun associated with the verb phrase 318. The name generating module 108 may use the dictionary 210 for this conversion. In the hierarchical tree 300, the name generating module 108 obtains the property term by converting the verb 302c "identifies" in the verb phrase 318 into a noun "identification". The name generating module 108 generates a dictionary entry name by combining the obtained terms 322, 324, 326. Thus, from the definition 302, the name generating module 108 can generate a dictionary entry name "person.identification.identifier".

In some embodiments, the predefined name format 206 may require detection and removal of redundancy in the unique name. Here, the name generating module 108 may detect the redundancy of the word "identification" and the word "identifier" because it is inherent that an identifier always serves to identify something. Therefore, the name generating module 108 may omit the property term 324 "identification". As a result, the unique name may be "person.identifier".

Figure 3B:
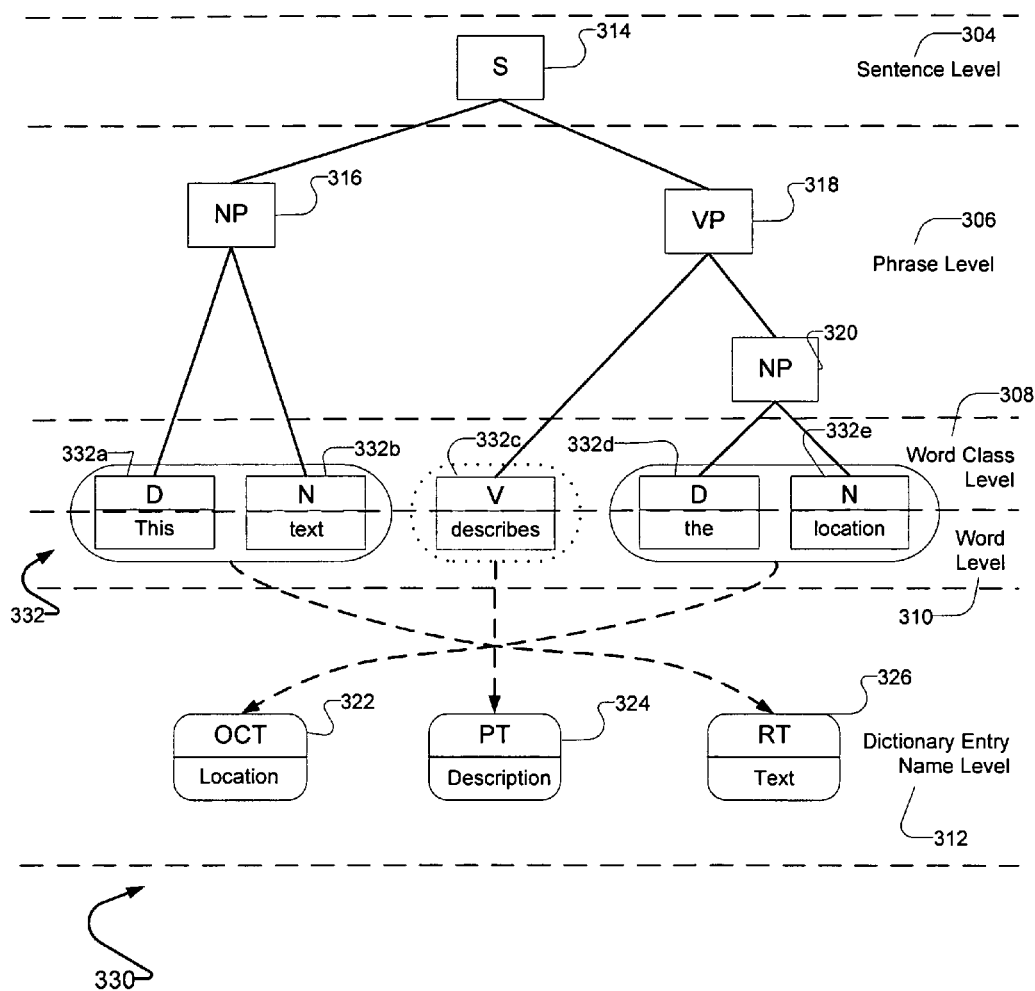
FIG. 3B is a hierarchical tree diagram showing an exemplary generation of a dictionary entry name from another data element definition.

FIG. 3B shows an exemplary hierarchical tree 330 that the name generating module 108 may create for another definition 332. The definition 332 reads "This text describes the location". In other words, the definition 332 states that the data element being defined is a text and that this text is to be used in describing a location. Based on this definition 332, the name generating module 108 will create a unique name for the data element.

Some of the elements in the tree 300 are shown also in the tree 330. Following a process similar to the one described above, the name generating module 108 parses the definition 332 from the sentence level 304 toward the word class level 308. Here, the first noun phrase 316 is "This text" and the verb phrase 318 is "describes the location". The name generating module 108 parses the verb phrase into the second noun phrase 320 "the location". At the word class level 308, the name generating module 108 parses the first noun phrase 316, the verb phrase 318 and the second noun phrase 320 to identify a first noun 332b "text", a verb 332c "describes" and a second noun 332e "location".

There may be more than one handling method for verb phrases. In one example, if a verb is transitive, which means that the verb has a subject and a direct object, then the verb will be represented as a property term in a noun form. For example, the definition "The code typifies the color" includes a transitive verb "typifies." The transitive verb is represented in a noun form, which reads "Color." In this particular example, a DEN reading "Color. Type. Code" is generated. In another example, if a verb is a ditransitive verb, which means that the verb has a direct object and an indirect or secondary object. As an example, the verb in the sentence "The code typifies the color of a car" is a ditransitive verb. In this example, the direct object will be a qualifier of the property term and the verb will be the property term in substantiated form. Also, the secondary object will be the object class. In exemptions, direct objects may be used as the property term instead of the verb itself. As an example, if the verb is "is," then the direct object will be the property term itself. As another example, the definition reading "This code is the type of a color" can generate a DEN that reads "Color. Type. Code."

After obtaining the first noun 332b, the verb 332c and the second noun 332e, the name generating module 108 follows the rules in the rule repository 212 to generate a dictionary entry name for the definition 332. The same predefined name format used in the exemplary hierarchical tree 300 is used here. From the definition 332, the name generating module 108 can generate a dictionary entry name "location.description.text" by using the second noun 332e "location" as the object class term 322 and the first noun 332b "text" as the representation term 326. The name generating module 108 can generate the property term 324 by converting the verb 332c "describes" in the verb phrase 318 into a noun "description".

Figure 3C:
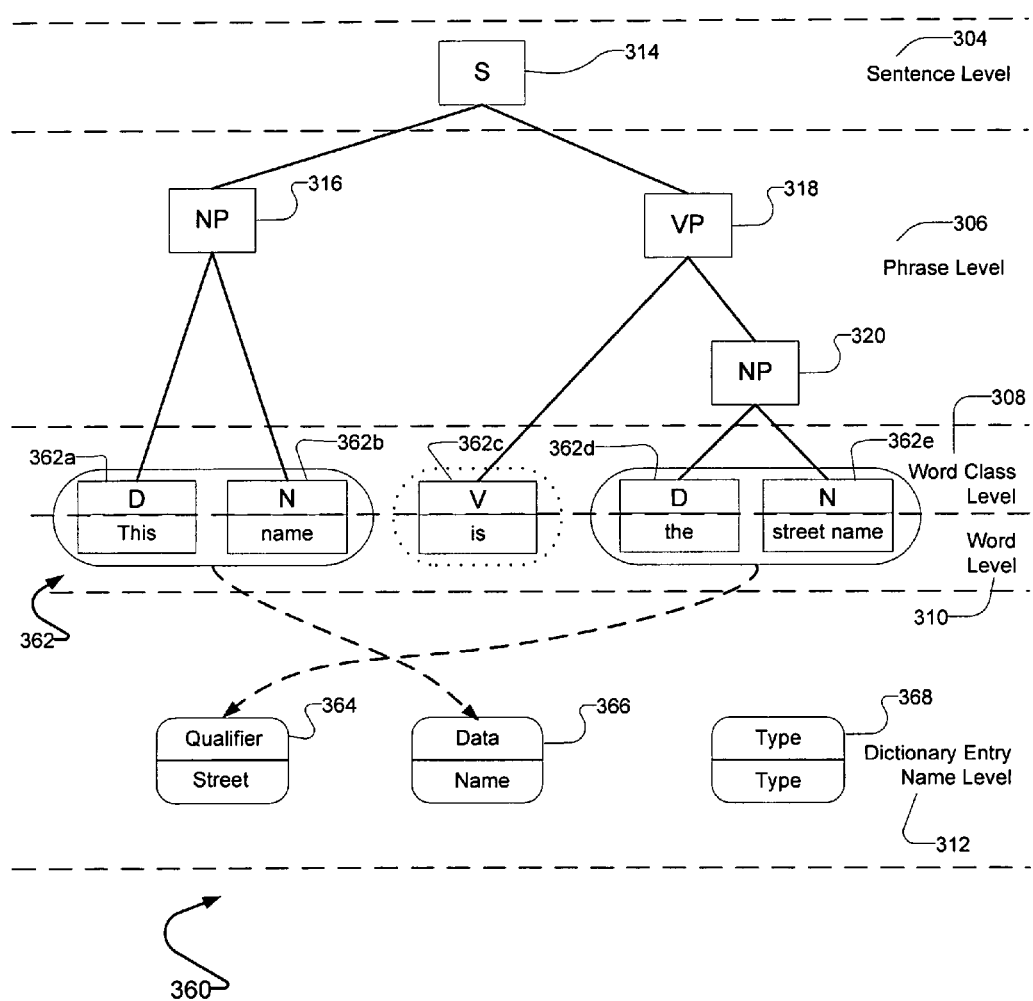
FIG. 3C is a hierarchical tree diagram showing an exemplary generation of a dictionary entry name from a data type definition.

FIG. 3C shows an exemplary hierarchical tree 360 that the name generating module 108 may create for another definition 362. In this example, the name generating module 108 is generating a unique name for a data type, which is a data element that can be used in defining any or all components that identify information portions in electronic communications. Similarly to the above, the description has previously been created. The definition 362 reads "This name is the street name". In other words, the definition 362 states that the data type being defined is a name and that this name is a street name. Based on this definition 362, the name generating module 108 will create a unique name for the data type.

Following a similar process described for the hierarchical tree 300 and the hierarchical tree 330, the name generating module 108 parses the definition 362 from the sentence level 304 toward the word class level 308. Here, the first noun phrase 316 is "This name" and the verb phrase 318 is "is the street name". The name generating module 108 parses the verb phrase 318 into the second noun phrase 320 "the street name". At the word class level 308, the name generating module 108 parses the first noun phrase 316, the verb phrase 318 and the second noun phrase 320 to identify a first noun 362b "name", a verb 362c "is" and a second noun 362e "street name", which is a compound noun.

From the words identified at the word level 310 and their corresponding classes at the word class level 308, the name generating module 108 may create a dictionary entry name following one or more rules defined in the rule repository 212. Here, the predefined name format 206 requires the unique name to include a data term and a qualifier term separated by an underscore character, followed by the term "type". A qualifier term is a specific part of a unique name of a data type that helps define and differentiate a name. A data term is a representation term, which represents the form of a set of valid values, of the data type.

Here, the name generating module 108 obtains a data term 366 "name" from the first noun 362b and a qualifier term 364 "street" from the compound noun 362e. By default, the third term is to be the word "type" 368. Thus, the unique name generated for the data type is "street_name.type". Additional examples will be described below with reference to FIGS. 7-9.

Figure 4:
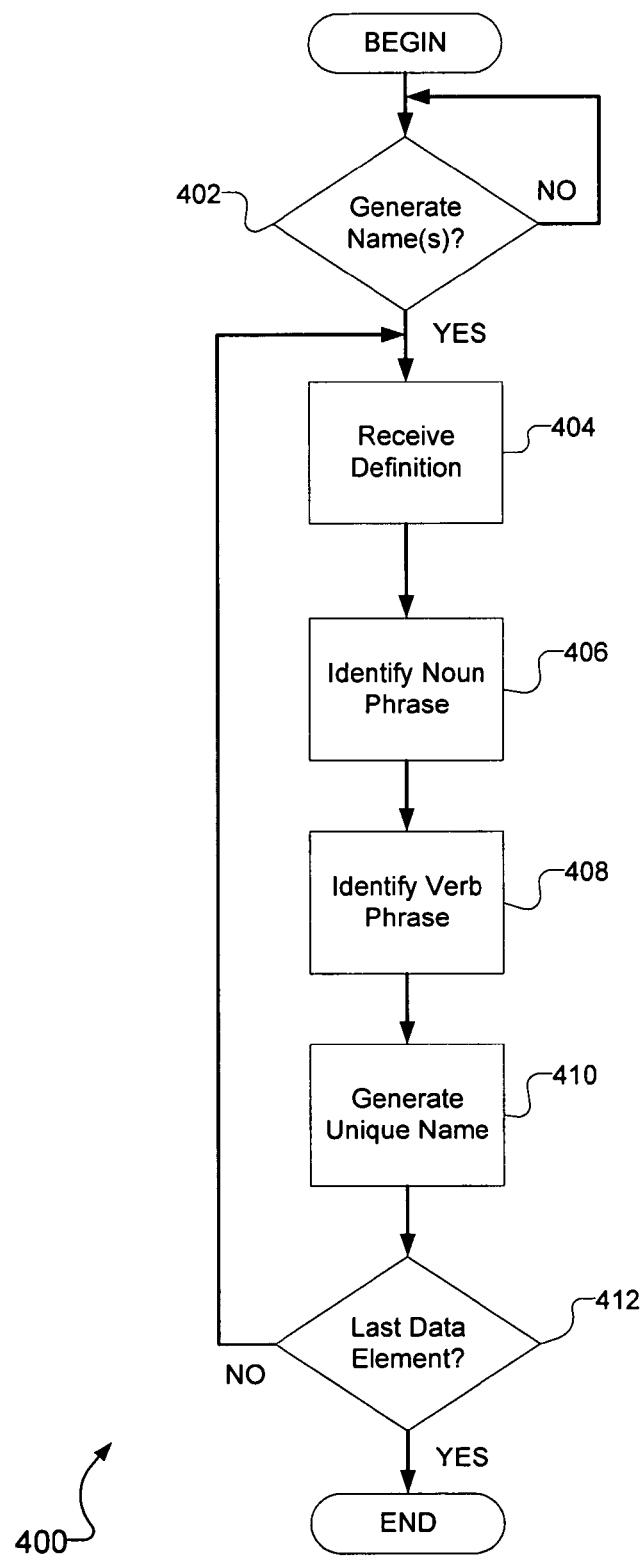
FIG. 4 is a flow chart illustrating a process of generating a unique name for data elements.

FIG. 4 is a flow chart of exemplary operations 400 for generating a unique name for data elements. The operations 400 can be performed, for example, by a processor executing instructions stored in a computer program product in the name generating module 108. The operations 400 begin in step 402 with the inquiry of whether a unique name is to be generated. For example, the name generating module 108 may determine to generate unique names if a user has submitted at least one definition to the system 102. The definition may be a definition of a core component or a data type, to name two examples. If the name generating module 108 determines that a unique name should be generated for a data element, the name generating module 108 receives a definition in step 404. For example, the name generating module 108 retrieves the definition from the repository 126.

The operations 400 involve identifying a noun phrase, in step 406, from the received definition. In step 408, a verb phrase is identified from the received definition. For example, the name generating module 108 may follow the rules in the rule repository 212. The name generating module 108 may use the grammar module 208 and the dictionary 210 in identification of the noun phrase in step 406 and identification of the verb phrase in step 408. In step 410, a unique name is generated for the received definition. For example, the name generating module 108 may assemble the unique name "person.identifier" for the definition 302 shown in FIG. 3A, or the unique name "location.description.text" for the definition 332 shown in FIG. 3B. As another example, it may assemble the unique name "street_name.type" for the data type definition 362 shown in FIG. 3C.

After a unique name is generated, the operations 400 determine, in step 412, whether a unique name should be generated for any other data element or whether this is the last data element. If it is determined that there is at least one more data element, the process from step 404 to step 412 may be performed to generate a unique name for the next data element using a definition for that element. Otherwise, the operations 400 end.

Figure 5:
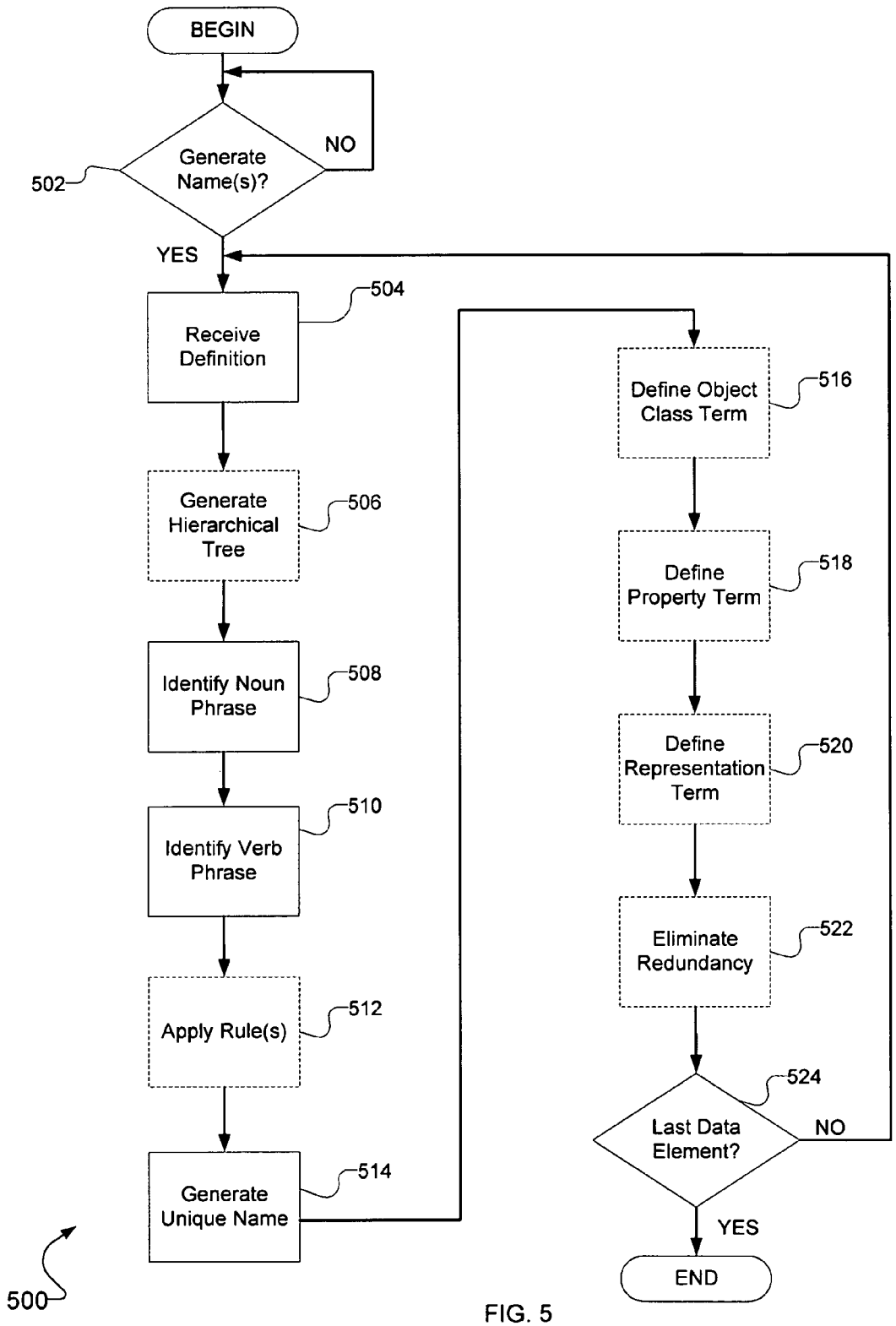
FIG. 5 is a flow chart illustrating a process of generating a unique name for data elements using a generated hierarchical tree.

FIG. 5 shows a flow chart of exemplary operations 500 for generating a unique name for a data element by generating a hierarchical tree. The operations 500 can be performed, for example, by the name generating module 108. The operations begin in step 502 with an inquiry of whether a unique name is to be generated. The name generating module 108 may determine to generate a unique name for a data element upon a user's instruction, to name just one example. If, in step 502, there is no instruction for the system to generate a unique name, the operations 500 return to step 502. If the name generating module 108 determines in step 502 that a unique name should be generated for a data element, the name generating module 108 receives a definition associated with the data element in step 504.

In optional step 506, a hierarchical tree is generated for the received definition. For example, the name generating module 108 may generate the hierarchical tree 300 for the definition 302 or the hierarchical tree 330 for the definition 332. Using the generated hierarchical tree, a noun phrase is identified in step 508 and a verb phrase in step 510. For example, in the hierarchical tree 300, the name generating module 108 identifies the noun phrase 316 "This identifier" and the verb phrase 318 "identifies the person" in the definition 302.

In step 512 rules are applied to the identified noun phrase and the identified verb phrase. For example, the name generating module 108 can use the rule(s) to identify in step 512 a first noun from the identified noun phrase and a second noun from the identified verb phrase by parsing the received definition at a word class level. As an example, the name generating module 108 identifies the first noun 332b "text" and the second noun 332e "location" by parsing the definition 332 at the word class level 310.

After the first noun, the second noun, and the verb phrase have been identified, a unique name is generated in step 514. To generate a unique name, there may be defined, in step 516, step 518 and step 520, an object class term, a property term, and a representation term respectively. The identified second noun may be used as the object class term in step 516. In step 518, the identified verb phrase may be converted to obtain another noun associated with the verb phrase as the property term. In step 520, the identified first noun may be used as the representation term. For example, in the hierarchical tree 330, the name generating module 108 obtains the object class term 322 from the second noun 332e "location" and obtains the representation term 326 from the first noun 332b "text". The name generating module 108 also converts the verb phrase 318 "describes the location" into a noun "description", which is associated with the verb phrase 318, as the property term 324.

In step 522, consecutive redundancy among the object class term, the property term, and the representation term may be eliminated. For example, in the hierarchical tree 300, the generated unique name is "person.identification.identifier" after defining the object class term 322, the property term 324, and the representation term 326. After a unique name is generated for the received definition, it is determined in step 524 whether this is the last data element. If there is at least one more data element, the process returns to step 504. Otherwise, the operations end.

Figure 6:
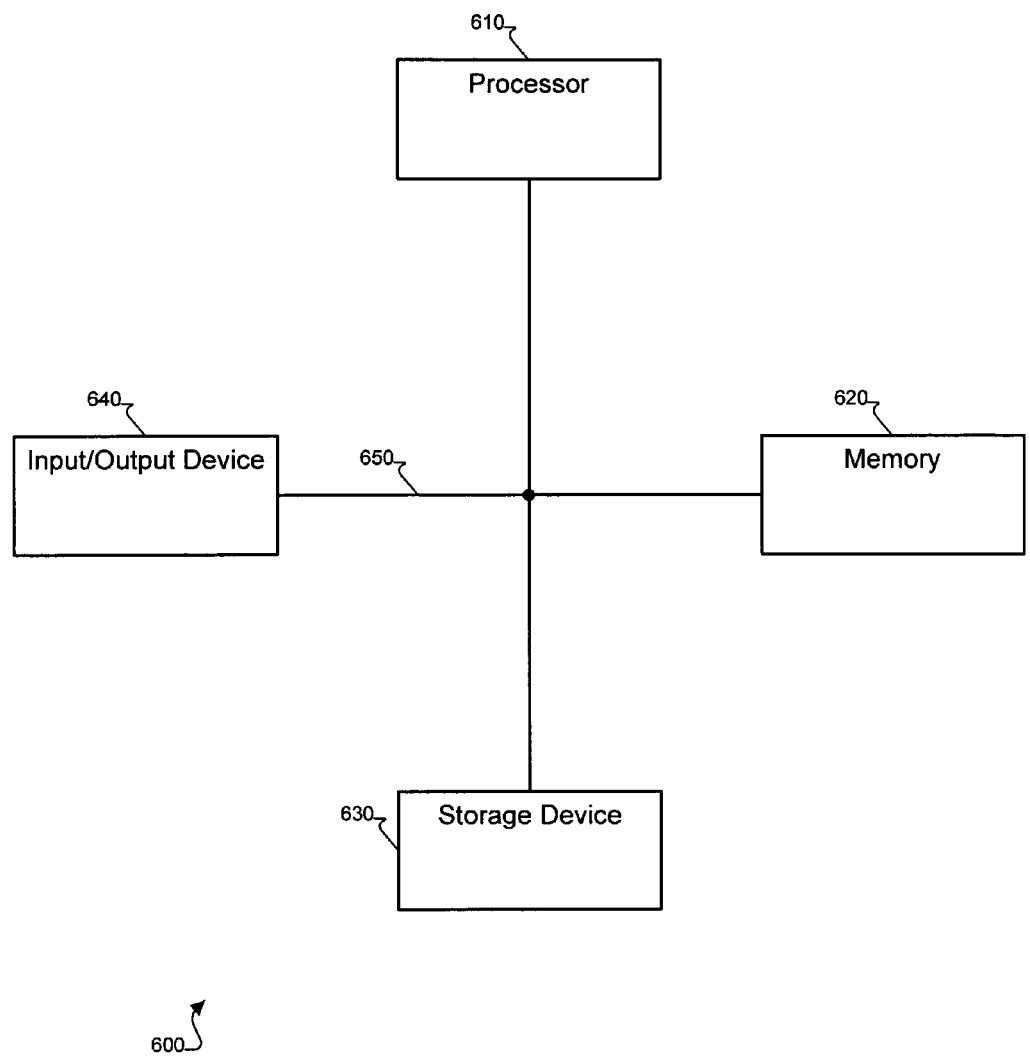
FIG. 6 is a block diagram of a computer system.

FIG. 6 is a block diagram of a computer system 600 that can be used in the operations described above, according to one embodiment. For example, the system 600 may be included in either or all of the computer system 102, the computer system 116, and the repository 126.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one embodiment, the processor 610 is a single-threaded processor. In another embodiment, the processor 610 is a multi-threaded processor. The processor 610 is capable of processing instructions stored in the memory 620 or on the storage device 630 to display graphical information for a user interface on the input/output device 640.

The memory 620 stores information within the system 600. In one embodiment, the memory 620 is a computer-readable medium. In one embodiment, the memory 620 is a volatile memory unit. In another embodiment, the memory 620 is a non-volatile memory unit.

The storage device 630 is capable of providing mass storage for the system 600. In one embodiment, the storage device 630 is a computer-readable medium. In various different embodiments, the storage device 630 may be a floppy disk device, a hard disk device, an optical disk device, or a tape device.

The input/output device 640 provides input/output operations for the system 600. In one embodiment, the input/output device 640 includes a keyboard and/or pointing device. In one embodiment, the input/output device 640 includes a display unit for displaying graphical user interfaces.

Figure 7:
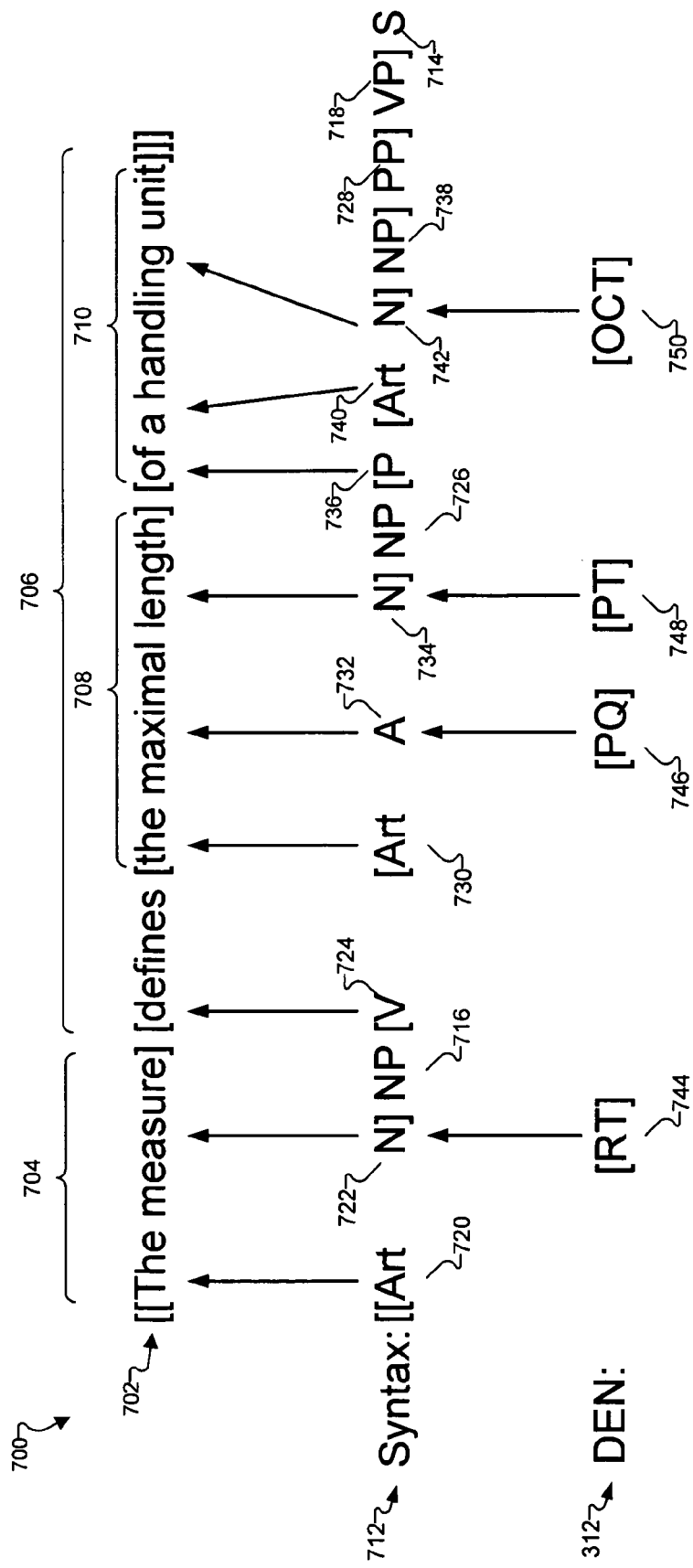
FIG. 7 is an annotation diagram that annotates a definition sentence.

The following are some additional examples of name generation. FIG. 7 shows an exemplary annotation 700 that includes a definition sentence 702. The name generating module 108 can receive the definition sentence 702 and then process it using the grammar module 208, the dictionary 210, and the rules in the rule repository 212, to name one example. The name generating module 108 may annotate the definition sentence 702 into nested and non-intersecting segments 704, 706, 708, 710. Here, the segment 706 includes the segments 708 and 710. In the depicted example, the name generating module 108 can annotate the definition sentence 702 into syntax, which may be a representation of systematic relationships between a syntactic form of the sentence 702 and a semantic meaning of the sentence 702. From these terms and their relationships, a dictionary entry name associated with the definition sentence 702 can be generated.

Referring to FIG. 7, the definition sentence 702 can be annotated at a syntax level 712. The following syntax annotations can be used here:

| Annotation | Meaning |
|---|---|
| S | Sentence |
| N | Noun |
| V | Verb |
| P | Preposition |
| A | Adjective |
| Adv | Adverb |
| Art | Article |
| NP | Noun Phrase |
| VP | Verb Phrase |
| PP | Prepositional Phrase |
| AP | Adjective Phrase |
| AdvP | Adverb Phrase |

Here, the name generating module 108 hierarchically annotates the definition sentence 702 from a sentence level to a word level. The name generating module 108 encloses the whole sentence 702 within a first set of brackets labeled as a sentence 714. Then the name generating module 108 can introduce a second set of brackets labeled as a noun phrase 716 and a third set of brackets labeled as a verb phrase 718 from the sentence 714. Next, the name generating module 108 identifies an article 720 and a noun 722 from the noun phrase 716. Within the verb phrase 718, the name generating module 108 identifies a verb 724, a noun phrase 726, and a prepositional phrase 728. Within the noun phrase 726, the name generating module 108 identifies an article 730, an adjective 732, and a noun 734. Similarly, from the prepositional phrase 728, the name generating module 108 can identify a preposition 736 and a noun phrase 738. The name generating module 108 can identify an article 740 and a noun 742 from the noun phrase 738.

After the syntax is identified in the definition sentence 702, the name generating module 108 can then apply rules to further refine the information available at the syntax level 712 and to complete the dictionary entry name (DEN) level 312. The name generating module 108 can use the following annotation:

| Annotation | Meaning |
|---|---|
| DEN | Dictionary Entry Name |
| T | Term |
| Q | Qualifier |
| P | Property |
| R | Representation |
| OC | Object Class |
| OCQ | Object Class Qualifier |
| OCT | Object Class Term |
| PQ | Property Qualifier |
| PT | Property Term |
| RT | Representation Term |

In this example, the noun 722 is selected as a RT 744, the adjective 732 is selected as a PQ 746, the noun 734 is selected as a PT 748, and the noun 742 is selected as an OCT 750. From the CCTS DEN predefined name format, the name generating module 108 can apply rules to generate a DEN associated with the definition 702 as "Handling Unit.Maximal_Length.Measure."

For example, the rule repository 212 may include the following rules:

Within a S, if the S has the structure "NP VP," then select R from the NP, and) select P and OC from the VP. (1)

Within a NP, if the NP has the structure "Art N," then select the N as T. (2a)

Within a NP, if the NP has the structure "Art A N," then select the A as Q and the N as T. (2b)

Within a VP, if the VP has the structure "V NP PP," then select P from the NP and select OC from the PP. (3a)

Within a VP, if the VP has the structure "V NP," then transform V into a noun and select the noun as P, and select OC from the NP. (3b)

Within a VP, if the VP has the structure "V PP," then select the V as P, where the V is transformed to a noun, and select OC from the PP. (3c)

Within a VP, if the VP has the structure "NP NP PP," then select OC from the PP and use the NP information for PT selection. (3d)

The rule 3*d* applies to, for example, sentences that contain a non-representative verb, such as "is", "are", "has" etc. Non representative means that the verb could be represented as a substantive. In such examples, the consecutive NP should be used, as the rule indicates.

Within a PP, if the PP has the structure "P NP," then select OC (4) from the NP.

Of the above exemplary rules, the rule (1) applies to the sentences, the rules (2*a*)-(2*b*) apply to the noun phrase, the rules (3*a*)-(3*d*) apply to the verb phrase, and the rule (4) applies to the preposition phrase, respectively.

Figure 8:
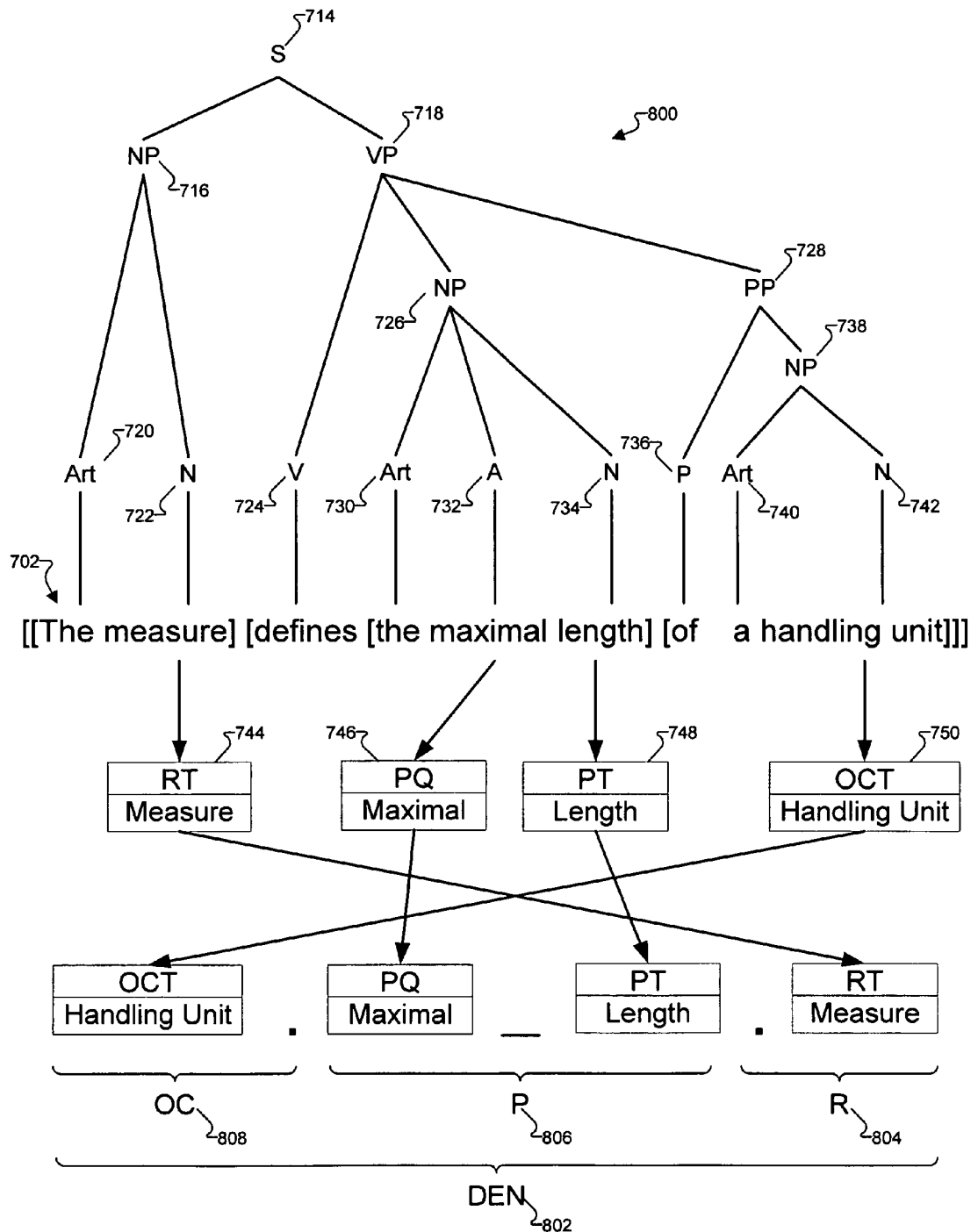
FIG. 8 is a hierarchical tree diagram showing an exemplary generation of a dictionary entry name from the definition sentence.

As an example, referring to FIG. 8, the definition 702 and the syntax annotations of the definition 702 are shown. A hierarchical tree 800 is depicted in FIG. 8. The name generating module 108 can use any or all of the rules (1)-(4) to generate a DEN 802 that reads "Handling Unit.Maximal_Length.Measure" from the definition 702.

As discussed with reference to FIG. 7, the name generating module 108 identifies the whole definition 702 as the S 714. As an example, the name generating module 108 applies the rules (1)-(4) in order. Upon applying rule (1), because the S 714 has the structure of "NP VP," meaning the S consists of the NP 716 followed by the VP 718, the name generating module 108 learns that a representation 804 is to be selected from the NP 716, and a property 806 and an object class 808 are to be selected from the VP 718.

The name generating module 108 applies rules (2a)-(2b) to the NP 716. Upon applying rule (2a), the NP 716 has the structure of "Art N." Thus, the name generating module 108 selects the N 722 as a term (T), which is the representation term (RT) 744. Since the NP 716 here is not "Art A N," rule (2b) does not lead to a selection.

The name generating module 108 applies rules (3a)-(3d) to the VP 718. Upon applying rule (3a), it is determine that the VP 718 has the structure "V NP PP." The name generating module 108 then leans that the property 806 is to be selected from the NP 726 and the object class 808 is to be selected from the PP 728. Since the VP 718 here is not "V NP," rule (3b) does not lead to a selection. Since the VP 718 here is not "V PP," rule (3c) does not lead to a selection. Since the VP 718 here is not "NP NP PP," rule (3d) does not lead to a selection.

The name generating module 108 applies rules (2a)-(2b) to the NP 726, which leads to the property 806 being selected from the NP 726. Since the NP 726 here is not "Art N," rule (2a) does not lead to a selection. Upon applying rule (2b), because the NP 726 has the structure of "Art A N," the name generating module 108 selects the A 732 as Q, forming the PQ 746, and the N 734 as T, forming the PT 748.

The name generating module 108 applies rule (4) to the PP 728, which leads to the object class 808 being selected from the PP 728. Upon applying rule (4), since the PP 728 has the structure of "P NP," the name generating module 108 learns that the object class 808 is to be selected from the NP 738.

The name generating module 108 applies rules (2a)-(2b) to the NP 738. The NP 738 has the structure "Art N." Upon applying rule (2a), the name generating module 108 selects the N 742 as the OCT 750. Since the NP 738 here is not "Art A N," rule (2b) does not lead to a selection.

Using the RT 744, the PQ 746, the PT 748, and the OCT 750, the name generating module 108 generates the DEN 802 according to the predefined name format 206.

Figure 9:
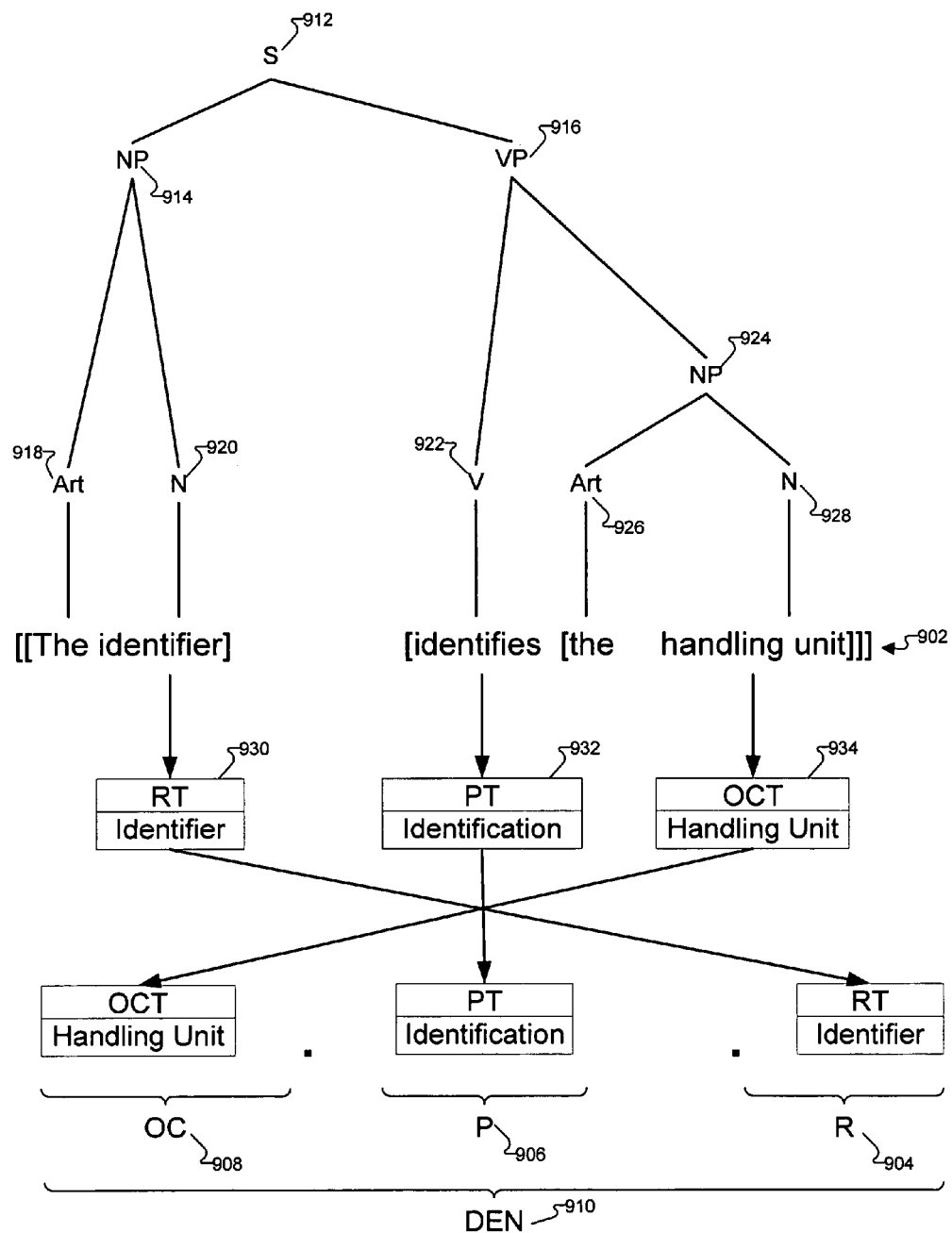
FIG. 9 is another hierarchical tree diagram showing an exemplary generation of a dictionary entry name from a definition sentence.

Referring to FIG. 9, another definition sentence 902 reads "The identifier identifies the handling unit." In this example, the name generating module 108 can apply rules (1)-(4) to select a representation 904, a property 906, and an object class 908 to generate a DEN 910, which reads "Handling Unit.Identification.Identifier," in accordance with the predefined name format 206.

As shown, the name generating module 108 identifies the sentence 902 as an S 912. The S 906 has a structure of a NP 914 followed by a VP 916. The NP 914 includes an Art 918 followed by an N 920. The VP 916 includes a V 922 followed by a NP 924. The NP 924 also has the structure of an Art 926 followed by an N 928.

The name generating module 108 applies rules (1)-(4) in order to generate a RT 930, a PT 932, and an OCT 934. Upon applying rule (1), because the S 912 has a "NP VP" structure, the representation 904 is to be selected from the NP, and the property 906 and the object class 908 are to be selected from the VP 916.

Upon applying rule (2a) to the NP 914, the NP 914 has the structure "Art N," so the name generating module 108 selects the N 920 as T, forming the RT 930. Upon applying rule (2b), rule (2b) does not lead to a selection.

The VP 916 is not "V NP PP," so rule (3a) does not lead to a selection. Upon applying rule (3b), the VP 916 here is "V NP," so the name generating module 108 transforms the V 922 into a noun 936 "identification" and selects the noun 936 as the PT 932. Also, by the rule (3b), the name generating module 108 learns that the object class 908 is to be selected from the NP 924. The VP 916 is not "V PP," so rule (3c) does not lead to a selection. The VP 916 is not "NP NP PP," so rule (3d) does not lead to a selection.

Upon applying rule (2a) to the NP 924, the NP 924 has the structure "Art N," so the name generating module 108 selects the N 928 as the OCT 934. Since the NP 924 here is not "Art A N," rule (2b) does not lead to a selection.

Using the RT 904, the PT 906, and the OCT 908, the name generating module 108 can generate the DEN 910 according to the predefined name format 206.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer program product tangibly embodied in a non-transitory computer readable medium, the computer program product including instructions that, when executed, cause a processor to perform operations for generating a unique name for at least one of several data elements, the operations comprising:
   receiving a definition of a data element for which a unique name is to be created that complies with a predefined name format, the unique name to be associated with the data element, the definition configured to aid users in understanding the data element, the definition comprising human-understandable descriptive language, the data element identifying an information category in an electronic communication;
   identifying a noun phrase and a verb phrase in the definition; and
   generating the unique name using a first noun obtained from the noun phrase and a second noun obtained from the verb phrase.

2. The computer program product of claim 1, wherein identifying the noun phrase and the verb phrase includes generating a hierarchical tree for the definition.

3. The computer program product of claim 2, wherein generating the hierarchical tree comprises parsing the definition at a word class level.

4. The computer program product of claim 1, wherein the noun phrase includes the first noun and wherein the verb phrase includes the second noun.

5. The computer program product of claim 1, wherein the verb phrase comprises another noun phrase and wherein the second noun is obtained from the other noun phrase.

6. The computer program product of claim 1, wherein the operations further comprise applying a rule to the definition to obtain at least one of the first and second nouns.

7. The computer program product of claim 6, wherein the rule defines how to truncate a word.

8. The computer program product of claim 1, wherein the predefined name format requires the unique name to comprise at least a first term for an object class to which the data element relates, and wherein the second noun is used as the first term.

9. The computer program product of claim 8, wherein the predefined name format requires the unique name to comprise also a second term for a property of the object class, and wherein another noun associated with the verb phrase is used as the second term.

10. The computer program product of claim 9, wherein the operations further comprise converting a verb in the verb phrase to obtain the other noun associated with the verb phrase.

11. The computer program product of claim 9, wherein the predefined name format requires the unique name to comprise also a third term for a representation form of the data element, and wherein the first noun is used as the third term.

12. The computer program product of claim 11, wherein the operations further comprise eliminating a consecutive redundancy among the first, second and third terms.

13. The computer program product of claim 1, wherein the data element comprises a data type that can be used in defining any of the several data elements and wherein the predefined name format requires the unique name to comprise at least a qualifier term, a data term and a type term.

14. The computer program product of claim 13, wherein the operations further comprise identifying a compound noun in the verb phrase and obtaining the qualifier term from the compound noun.

15. A computer system comprising:
   a repository having stored therein data elements that are configured to identify information categories in an electronic communication, each of the data elements being associated with a definition comprising human-understandable descriptive language; and
   a name generating module that receives at least one of the definitions that is associated with one of the data elements and generates a unique name for the data element that complies with a predefined name format, the unique name to be associated with the data element, the definition configured to aid users in understanding the data element, the unique name being generated using a first noun and a second noun, the first noun being obtained from a noun phrase in the definition and the second noun being obtained from a verb phrase in the definition.

16. The computer system of claim 15, wherein the name generating module generates a hierarchical tree for the definition.

17. The computer system of claim 15 wherein the name generating module further comprises rules that can be applied to the definition to obtain at least one of the first and second nouns.

18. The computer system of claim 15, wherein the predefined name format requires the unique name to comprise at least a first term for an object class to which the data element relates, and wherein the name generating module uses the second noun as the first term.

19. The computer system of claim 18, wherein the predefined name format requires the unique name to comprise also a second term for a property of the object class, and wherein the name generating module uses another noun associated with the verb phrase as the second term.

20. The computer system of claim 19, wherein the predefined name format requires the unique name to comprise also a third term for a representation form of the data element, and wherein the name generating module uses the first noun as the third term.

* * * * *